(12) United States Patent
Marcus et al.

(10) Patent No.: US 8,330,870 B2
(45) Date of Patent: Dec. 11, 2012

(54) DYNAMIC ILLUMINATION CONTROL FOR LASER PROJECTION DISPLAY

(75) Inventors: Michael A. Marcus, Honeoye Falls, NY (US); John A. Agostinelli, Rochester, NY (US); James G. Phalen, Rochester, NY (US); Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 433 days.

(21) Appl. No.: 12/632,854

(22) Filed: Dec. 8, 2009

(65) Prior Publication Data

US 2011/0134344 A1 Jun. 9, 2011

(51) Int. Cl.
*H04N 5/45* (2011.01)

(52) U.S. Cl. .................................................... 348/678

(58) Field of Classification Search .............. 348/678, 348/679, 687, 688; 345/102, 690; 600/160
See application file for complete search history.

(56) References Cited

U.S. PATENT DOCUMENTS

| | | | |
|---|---|---|---|
| 5,982,553 A | 11/1999 | Bloom et al. | |
| 6,144,481 A | 11/2000 | Kowarz et al. | |
| 6,215,579 B1 | 4/2001 | Bloom et al. | |
| 6,307,663 B1 | 10/2001 | Kowarz | |
| 6,411,425 B1 | 6/2002 | Kowarz et al. | |
| 6,476,848 B2 | 11/2002 | Kowarz et al. | |
| 6,663,788 B2 | 12/2003 | Kowarz et al. | |
| 6,678,085 B2 | 1/2004 | Kowarz et al. | |
| 6,747,694 B1* | 6/2004 | Nishikawa et al. | 348/229.1 |
| 6,802,613 B2 | 10/2004 | Agostinelli et al. | |
| 7,065,257 B2* | 6/2006 | Soga et al. | 382/274 |
| 7,133,184 B2 | 11/2006 | Shin et al. | |
| 7,204,594 B2 | 4/2007 | Akiyama | |
| 7,403,332 B2 | 7/2008 | Whitehead et al. | |
| 7,413,314 B2 | 8/2008 | Kim et al. | |
| 7,505,027 B2* | 3/2009 | Daly | 345/102 |
| 7,777,816 B2* | 8/2010 | Chang et al. | 348/620 |
| 7,982,822 B2* | 7/2011 | Feng | 349/62 |
| 8,085,303 B2* | 12/2011 | Sayre | 348/189 |
| 8,134,646 B2* | 3/2012 | Miyazawa | 348/625 |
| 8,199,100 B1* | 6/2012 | Barnhoefer | 345/102 |
| 2003/0052979 A1* | 3/2003 | Soga et al. | 348/241 |
| 2005/0201715 A1 | 9/2005 | Ellwood | |
| 2006/0244921 A1 | 11/2006 | Childers | |
| 2006/0274213 A1* | 12/2006 | Saier et al. | 348/673 |
| 2007/0027362 A1* | 2/2007 | Handa et al. | 600/160 |
| 2008/0018795 A1* | 1/2008 | Miyazawa | 348/625 |

\* cited by examiner

*Primary Examiner* — Paulos Natnael
(74) *Attorney, Agent, or Firm* — Nelson Adrian Blish

(57) ABSTRACT

A method for improving image contrast for a display apparatus obtains a frame of image data having one or more code values for each pixel in the frame of image data, analyzes the frame of image data to identify a distribution of dark regions therein. The method further adjusts at least one of the one or more code values for the frame of image data according to the distribution of dark regions in the frame of image data and attenuates a brightness level available for the image frame according to the distribution of dark regions in the frame of image data.

11 Claims, 17 Drawing Sheets

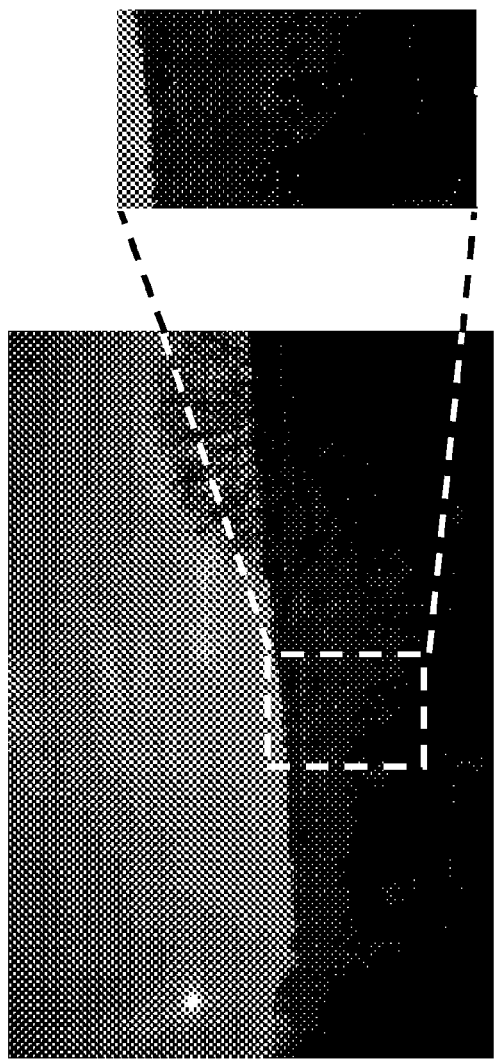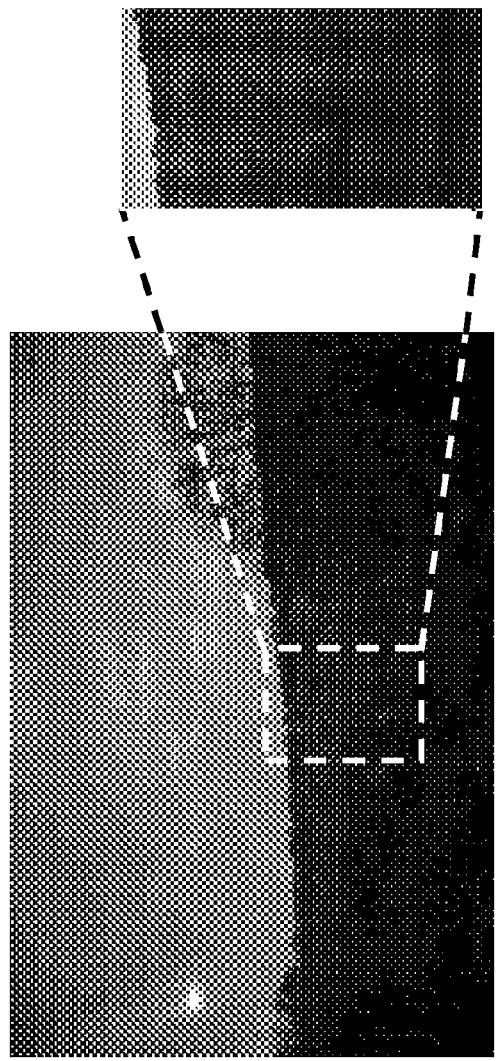
FIG. 9A
FIG. 9B

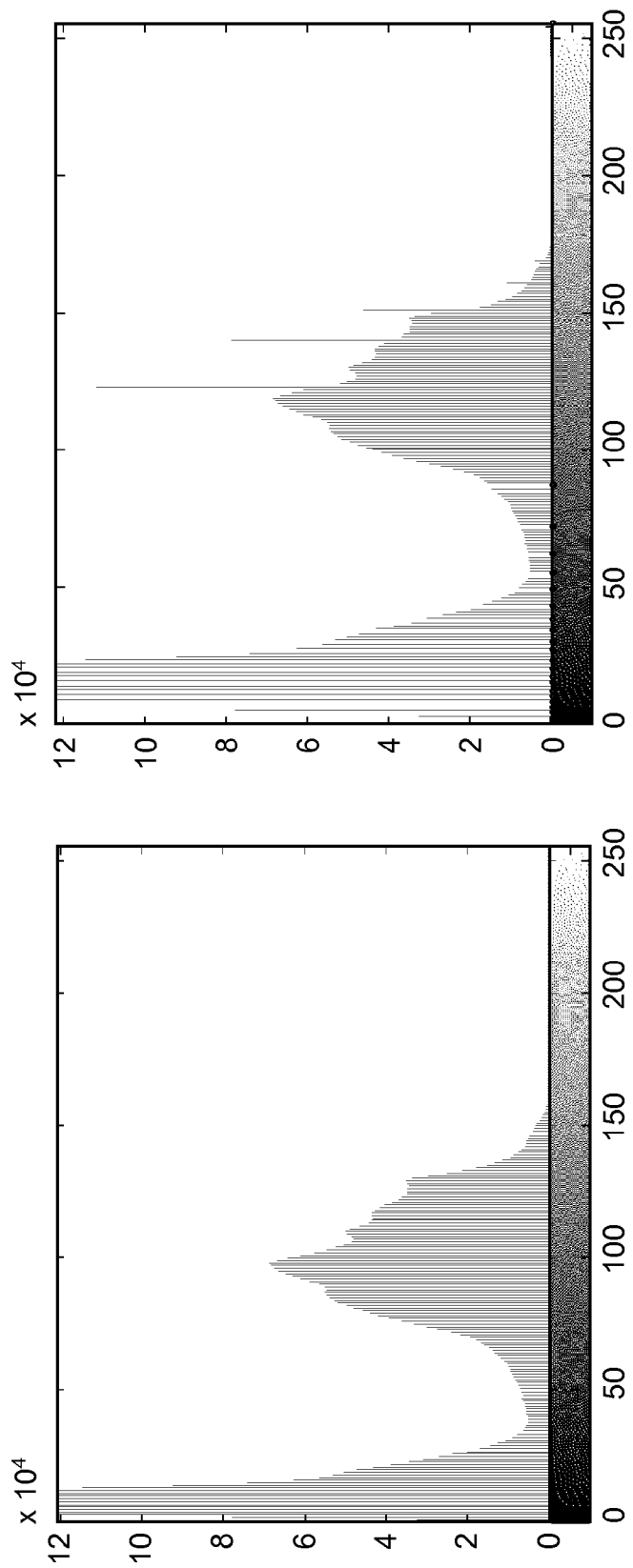

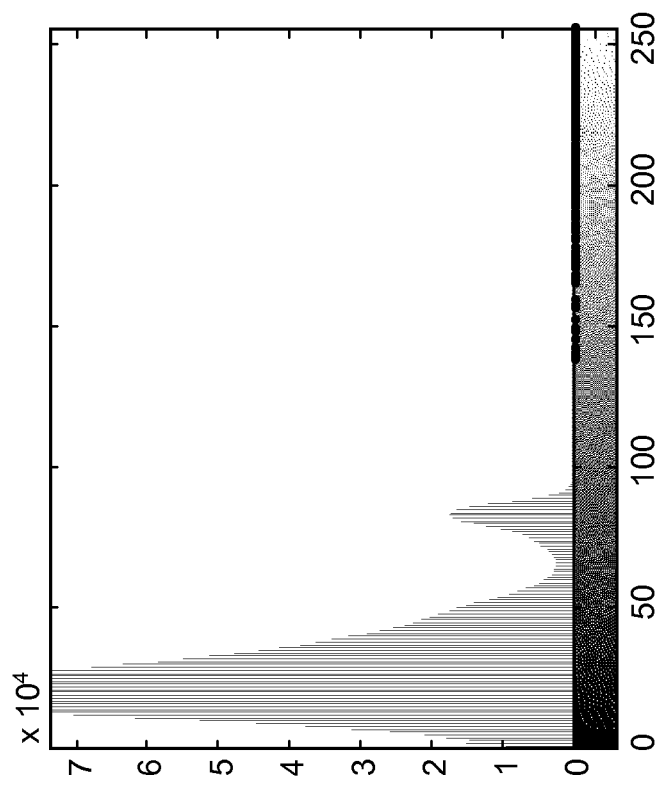
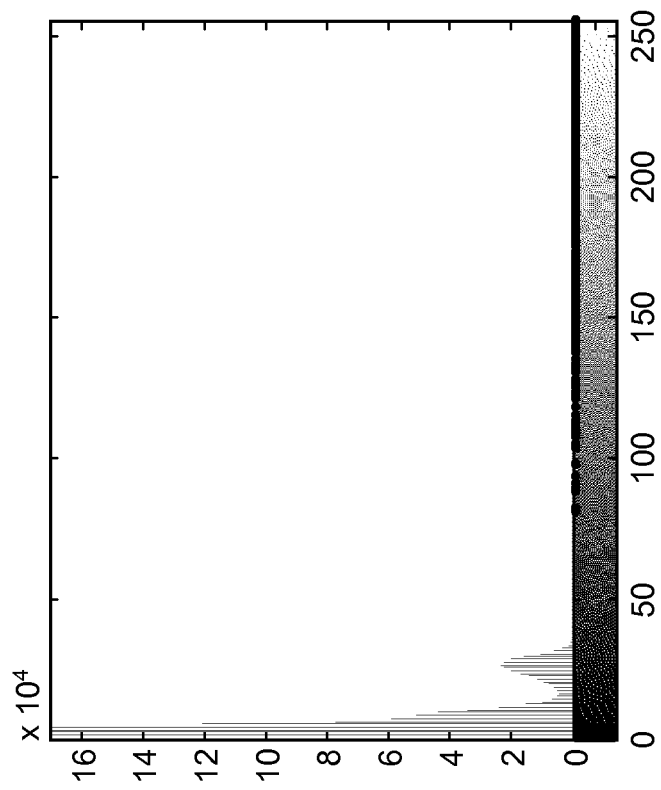

DYNAMIC ILLUMINATION CONTROL FOR LASER PROJECTION DISPLAY

CROSS REFERENCE TO RELATED APPLICATIONS

Reference is made to commonly-assigned U.S. patent application Ser. No. 12/484,374 (now U.S. Publication No. 2010/0315595), filed Jun. 15, 2009, entitled DYNAMIC ILLUMINATION CONTROL FOR LASER PROJECTION DISPLAY, by Marcus et al., the disclosure of which is incorporated herein

FIELD OF THE INVENTION

The present invention relates to electronic display apparatus using spatial light modulators and more particularly relates to apparatus and methods for improved contrast and dynamic range in an electronic projection system.

BACKGROUND OF THE INVENTION

A critical performance measure in image projection systems is the contrast ratio (C/R) which represents the light intensity difference between the brightest white and the darkest black. C/R is thus defined by the relationship:

$$C/R = \text{white luminance/black luminance} \quad (1).$$

Improving the C/R helps to provide better on-screen image reproduction.

In general it is difficult to increase C/R by increasing the white luminance of the projection system since most projectors are light source limited. Thus approaches to improve the contrast ratio attempt to decrease the black luminance level. The black luminance level is a result of light that passes through the active display devices in the off state and stray light coming through the projection optics of the display. Stray light can come from unwanted reflections from optical components of the projection system.

There have been a number of proposed approaches to improving the contrast ratio of an electronic display. For example, in U.S. Pat. No. 7,413,314 (Kim et al.) describes an optical system having an iris controlled in real time for reducing light from devices in the off state. In the '314 optical system, an iris controller senses luminance information in the light output and controls the projection iris according to the luminance information. With the opening range of the iris controlled in real time, the contrast ratio (C/R) is improved.

U.S. Pat. No. 7,204,594 (Akiyama) describes a projector including an illumination device, an electro-optic modulator, and a projection optical system that includes a light shielding member provided with a stray light elimination member that reflects unwanted light away from the projection optics path.

Another approach has been to modify the display screen itself. For example, U.S. Pat. No. 7,403,332 (Whitehead et al.) describes a display having a screen incorporating a light modulator which is illuminated by a light source composed of an array of controllable light emitters. The controllable emitters and elements of the light modulator may be controlled to adjust the intensity of light emanating from corresponding areas on the screen.

Each of these conventional approaches for contrast ratio improvement has its shortcomings. The mechanical iris of the '314 disclosure must be a high-speed device and can be relatively costly. The light-shielding member of the '594 disclosure sends stray light out of the projection path and to other surfaces inside the projector, with the potential for some portion of this light to be projected onto the screen. The specialized display screen taught in the '332 disclosure adds significantly to projection system cost and may not be a suitable solution where it is desirable to replace existing film projection equipment.

Of particular interest are solutions that are appropriate for projection systems that use laser light sources. These can include, for example, systems that use spatial light imaging modulators such as liquid crystal devices (LCDs) or digital micromirror devices, such as the DLP device from Texas Instruments, Inc., Dallas, Tex.

Another type of imaging modulator device that is well-suited for use with laser sources are linear light modulators. Linear light modulators form images by a rapid, repeated sequence in which each single line of the image is separately formed and is directed to a screen or other display surface by reflection, or other type of redirection, from a scanning element. Types of linear light modulators that operate in this manner include devices such as grating light valves (GLV) from Silicon Light Machines and described in U.S. Pat. No. 6,215,579 (Bloom et al.), and elsewhere. Display systems based on GLV devices are disclosed, for example, in U.S. Pat. No. 5,982,553 (Bloom et al.). Another type of linear light modulator is the piezoelectric based spatial light modulator (SOM) developed by Samsung and disclosed, for example, in U.S. Pat. No. 7,133,184 (Shin et al.).

An improved type of linear imaging modulator is the grating electro-mechanical system (GEMS) device, as disclosed in commonly-assigned U.S. Pat. No. 6,307,663 (Kowarz), and elsewhere. Display systems based on a linear array of conformal GEMS devices are described in commonly-assigned U.S. Pat. Nos. 6,411,425, 6,678,085, and 6,476,848 (all to Kowarz et al.). Further detailed description of GEMS device architecture and operation is given in a number of commonly-assigned U.S. patents and published applications, including U.S. Pat. Nos. 6,663,788 (Kowarz et al.), and 6,802,613 (Agostinelli et al.). In these devices, light is modulated by diffraction. On a GEMS chip, for example, a linear array of conformal electromechanical ribbon elements, formed on a single substrate, is actuable to provide one or more diffracted orders of light to form each line of pixels for line-scanned projection display.

Color display system architectures using LCD, DLP, GLV, SOM, and GEMS devices generally employ three separate color paths, red, green, and blue (RGB), each color path provided with a separate spatial light modulator and laser source. When actuated, the light imaging modulator modulates its component red, green, or blue laser light to form the image, a single frame of pixels or line of pixels at a time. The resulting modulated frames of pixels or lines of pixels for each color are then combined onto the same output axis to provide a full-color image that is then directed onto the display screen.

Linear light imaging modulator arrays have exhibited some advantages over their area array spatial light modulator (SLM) counterparts by virtue of higher resolution, reduced cost, and simplified illumination optics. GLV and GEMS devices are actuable to operate at fast switching speeds for modulating laser light. GLV and GEMS devices have advantages for high resolution, high native bit depth, variable aspect ratio, and relative freedom from motion artifacts when compared against other types of spatial light modulators.

However, there are a number of limitations inherent to linear spatial light modulators that can tend to constrain projector performance. A number of limitations relate to the scanning sequence itself. The galvanometrically actuated scanning mirror that is conventionally used to scan modulated light across the display surface rotates over a short angular range to form each 2-D (two-dimensional) frame of the image. Following each scan, mirror position must then be reset into the starting position for the next scan. During this reset interval, image content is not projected, when using the standard scanning sequence. Thus, light output is not available during about 15-25% of the operating cycle, since the mirror requires some amount of time to stop, reverse direction, and return back into position for the next scan. This inherent reduction of the available light output limits the light efficiencies that can be obtained. Due to this scanning mirror reset time and to acceleration and deceleration times of the mirror, the effective duty cycle for providing modulated light with such systems, the so-called "pixel on" time, is typically no more than about 72-85%.

Another problem related resulting from the scanning sequence relates to the need to minimize the effects of stored charge as the ribbon elements are repeatedly switched between positions. Electrostatic energy is used to actuate the ribbons. Maintaining the same charge polarity for the integrated circuit (chip) substrate from one scan to the next quickly builds up a residual charge in the device that must be compensated for or dissipated in some way. In response to the problems of charge build-up, commonly-assigned U.S. Pat. No. 6,144,481 (Kowarz et al.) discloses a method for correcting for charge accumulation in the spatial light modulator device. This method applies, to the dielectric ribbon elements, a modulated bipolar voltage signal whose time average is equal to the time average of a bias voltage applied to the bottom conductive layer of the modulator device. The resulting alternating waveform switches the polarity of the substrate bias voltage effectively canceling the charge build-up during operation of the device.

Although the method described in the Kowarz et al. '481 disclosure corrects for problems related to charge build-up, transient movement of the modulating ribbon elements can result as the voltage is switched. Usually the voltage is switched during the reset interval of the scanning mirror and stray light can reach the screen when the voltage is switched, thus degrading system contrast. A small amount of light is also inadvertently directed into the optical system during this transient which can result in extra reflections and stray light passing through the projection optics reaching the display screen. All of these factors can degrade system contrast.

Area spatial light imaging modulators such as DLP devices do not exhibit the same switching effects as linear GEMS, SOM, and GLV devices. However, both area and linear light-modulating devices have a refresh cycle, during which unmodulated light can be inadvertently directed to the display surface. While the laser itself could be momentarily turned off to eliminate stray light during the refresh cycle, such a mode of operation is not optimal for existing semiconductor laser devices, compromising wavelength and thermal stability and potentially shortening laser lifetimes.

Related to the problem of image contrast is the relative distribution of data values over portions of the image. Many types of images include an area or band of darker values over which there is little perceptible difference in intensity. Stated differently, such images exhibit a high percentage of relatively indistinguishable dark values or "dark noise." Because there is little difference in contrast over such an area, many features within the image are effectively lost. The skyline of FIG. 1 shows one example. In this image, only a silhouette of the skyline is clearly displayed; there is little or no perceptible detail within the skyline band. Buildings, for example, are seen substantially in outline, with almost none of the features within the outline of a building visible. Using conventional display and data value mapping techniques, this poor contrast over such a local area is the best that can be achieved. Even with imaging equipment that is sensitive enough to capture subtle differences in detail, areas of poor contrast over darker regions of the image effectively prevent this detail from being displayed.

Thus, it can be seen that improving image contrast relates not only to methods that help to reduce stray light, but also to methods that can help to make details more visible within darker areas and other local areas of an image. There is a need to simultaneously decrease stray light and to improve the contrast of objects in darker areas of an image in projection apparatus where laser illumination is employed.

SUMMARY OF THE INVENTION

Briefly, according to one aspect of the present invention, there is provided a method for improving image contrast for a display apparatus, which includes obtaining a frame of image data that includes one or more code values for each pixel in the frame of image data; analyzing the frame of image data to identify a distribution of dark regions therein; adjusting at least one of the one or more code values for the frame of image data according to the distribution of dark regions in the frame of image data; and attenuating a brightness level available for the image frame according to the distribution of dark regions in the frame of image data.

It is an advantage of the present invention that it provides an adaptive method and apparatus for improving image contrast in a digital image projector.

With linear and area light modulators, light attenuation is combined with laser blanking, synchronized to the scan to minimize stray light on screen from light passing through the optics when the lasers are off the screen. For example, during this time period, when a GEMS device is used, the charge applied to the substrate may be flipped to eliminate hysteresis. Laser blanking minimizes the stray light which occurs during the substrate flipping. The laser blanking can be accomplished by either switching the laser off or using an electrooptic modulation device.

The use of an electro-optic modulation device, such as an LC optical shutter, allows both laser blanking and dynamic illumination control. When an image has a low maximum code value, the contrast of the image can be enhanced by making the blacks appear blacker and boosting the delivered code values of the image proportionally by the amount of attenuation. Also, the modulation device can be segmented so that different regions on the screen can have different amounts of attenuation. This is useful for scenes in which bright areas exist such as sun-filled sky towards the upper parts of the image and dark details at the bottom of the image. As an example, if the maximum intensity of a scene is only 10% of the maximum, code values in the image can be adjusted by a 10× range and the attenuator can be set for 10× attenuation. This can increase the contrast significantly.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 9A is an example original image having considerable dark pixel content;

FIG. 9B is a simulated image showing the results of applying the method of the present invention to the original image of FIG. 9A;

FIG. 9C is a histogram showing code values for FIG. 9A;

FIG. 9D is a histogram showing code values for adjusted FIG. 9B;

FIG. 10C is a histogram showing code values for FIG. 10A;

FIG. 10D is a histogram showing code values for adjusted FIG. 10B;

DETAILED DESCRIPTION OF THE INVENTION

Figure 1:
FIG. 1 is a plan view of an image having a dark region that conventionally displays with poor contrast.

The present description is directed in particular to elements forming part of, or cooperating more directly with, apparatus in accordance with the invention. It is to be understood that elements not specifically shown or described may take various forms well known to those skilled in the art. Figures shown and described herein are provided in order to illustrate key principles of operation of the present invention and are not drawn with intent to show actual size or scale. Some exaggeration may be necessary in order to emphasize relative spatial relationships or principles of operation.

In the context of the present invention, a "dark region" in an image frame is an area of the image frame that contains a substantial number of pixels below a given threshold code value for darkness within an image. The definition of what constitutes a dark region in any particular case depends on a number of factors, including the type of imaging system and its data representation scheme, the number of pixels below some threshold code value that is identified as dark for that system, and user perception. For the examples given in the present invention, low data values, such as values below 50 for an 8-bit system with a range of image code values from 0 to 255, are assigned as dark values in a projected image.

In color display systems image frame data usually consists of 8, 12, or 16 bit integer data provided in the form of an image frame matrix of size R by C by 3 where R is the number of rows in the display, C is the number of columns in the display and 3 is the number of color planes used to display the image. The location of each image pixel on the display is indicated by the row and column number of the image frame data. The third dimension of the matrix is defined as the color plane with 1 corresponding to the red color plane, 2 to the green color plane, and 3 to the blue color plane. Other sets of color planes can also be used for encoding the data, dependent on the image processing that is done at the projector, but assume RGB encoding in the discussions that follow. In matrix notation if MD was the next image frame data matrix then IFD (500,600,2)=27 tells that the $500^{th}$ row and $600^{th}$ column has a green code value of 27 in 8-bit space which would be considered dark by the above criteria. In order for a pixel to be considered dark the code values for all three color planes should be dark. If IFD(500,600,1)=255 this would imply that the same pixel has the maximum red code value and is very bright.

It should be noted that an alternate data representation scheme could have dark pixels having a value above a certain threshold. The apparatus and methods of the present invention adapt equally to either of these possible data arrangements, as well as to pixel data representations that use fewer than or more than 8 data bits per pixel. For the methods and apparatus of the present invention, the distribution of dark code values is used to determine, for one or more image frames, both how image data is adjusted and how output brightness is attenuated.

The apparatus and method of the present invention can be used with a display imaging apparatus that employs any of a number of different types of spatial light modulator. By way of an illustrative example, the description that follows is directed primarily to a display apparatus that uses GEMS devices. However, it must be noted that similar approaches and solutions can also be used for display apparatus that use other linear spatial light modulators or that use area spatial light modulators such LCD devices or DLP modulators that use arrays of digital micromirror devices.

In the context of the present invention, the term "chip" is used as it is familiarly used by those skilled in the microelectromechanical device arts. The term chip refers to the one-piece electromechanical circuit package that includes one or more light modulator arrays formed on a single substrate, such as the conformal grating devices described in detail in commonly-assigned U.S. Pat. No. 6,411,425 (Kowarz et al.), mentioned earlier. The GEMS chip not only includes the elongated ribbon elements that form the light-modulating grating for light reflection and diffraction, but may also include the underlying circuitry that applies the electrostatic force that is used to actuate these ribbon elements. In manufacture, the tiny electronic and mechanical components that form the chip, such as the GEMS chip shown in the Kowarz et al. '425 patent, are fabricated onto a single substrate. The chip package also includes signal leads for interconnection and mounting onto a circuit board or other suitable surface.

Methods of the present invention are particularly well-suited to take advantage of the high brightness levels of polarized light available from laser and other solid-state light sources. These methods can also be applied where xenon arc lighting or other light sources are used, where the modulated light output is substantially polarized.

Figure 2:
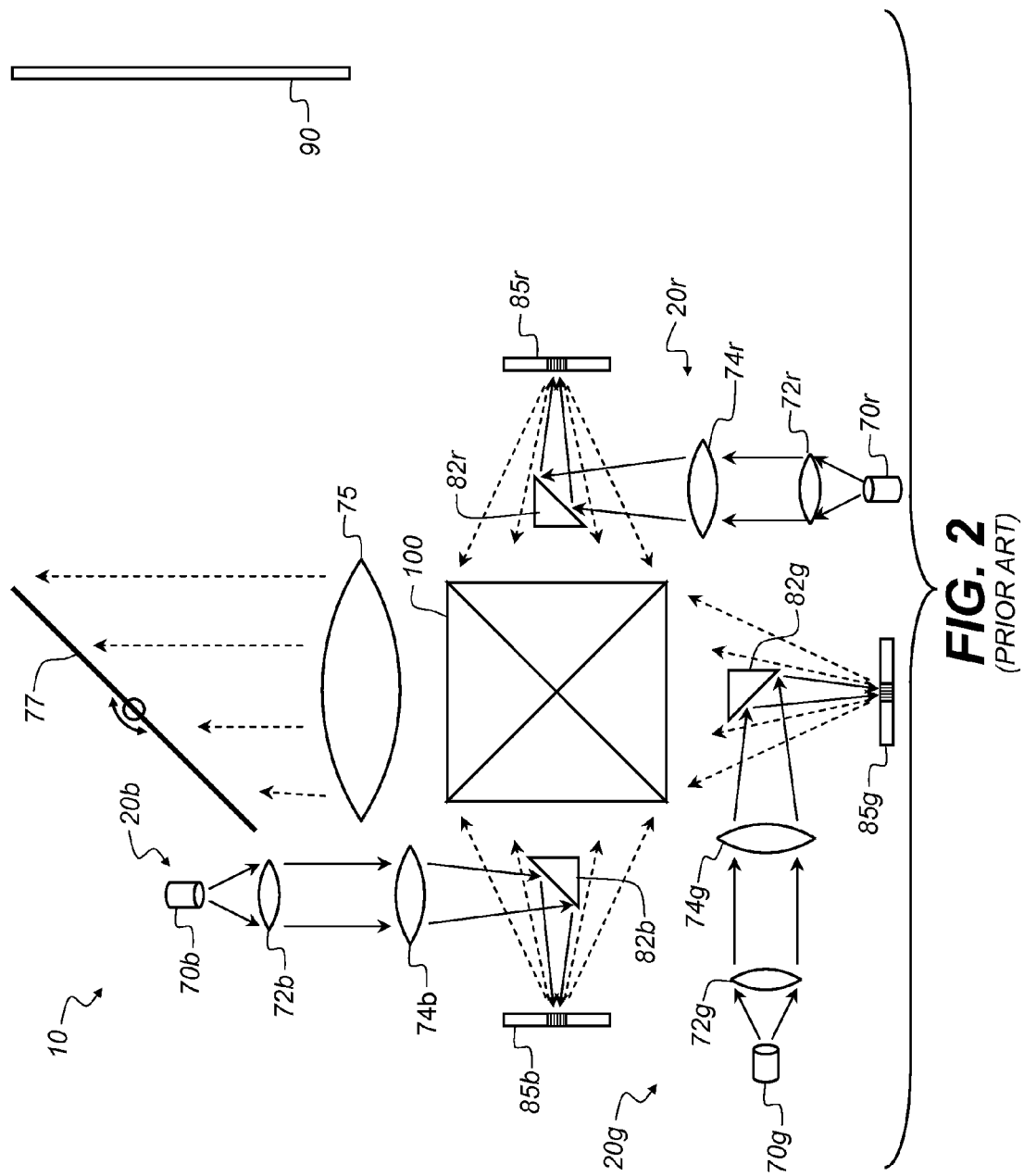
FIG. 2 is a schematic block diagram that shows components of a projection apparatus that uses a GEMS imaging modulator in each color channel.

Referring to FIG. 2, there is shown a projection display apparatus 10 using a GEMS device as linear light imaging modulator in each of three color channels, a red color channel 20r, a green color channel 20g, and a blue color channel 20b. For red color modulation, a red light source 70r, typically a laser or laser array, provides illumination that is conditioned through a spherical lens 72r and a cylindrical lens 74r and directed towards a turning mirror 82r. Light reflected from turning mirror 82r is modulated by diffraction at a linear light imaging modulator 85r, shown and described herein as an electromechanical grating light modulator. Modulated diffracted light from linear light imaging modulator 85r is diffracted past turning mirror 82r and to a color combiner 100, such as an X-cube or other dichroic combiner. The modulated line of light from color combiner 100 is then directed by a lens 75, through an optional cross-order filter (not shown), to a scanning element 77 for projection onto a display surface 90. Scanning element 77 can be a scanning mirror commonly referred to as a galvanometer or a galvo or other suitable light-redirecting scanning element, such as a rotating prism or polygon or an apparatus having one or more coupled reflective surfaces, which apparatus, in turn, directs the incident modulated lines of light for forming 2D images toward display surface 90. Green color modulation uses a similar set of components for providing light to color combiner 100, with a green light source 70g, typically a laser or laser array, providing illumination through a spherical lens 72g and a lens cylindrical 74g and directed towards a turning mirror 82g. Light reflected from turning mirror 82g is modulated by diffraction at an electromechanical grating light modulator that serves as a linear light imaging modulator 85g. Modulated diffracted light from linear light imaging modulator 85g is diffracted past turning mirror 82g and to color combiner 100. Similarly, blue light source 70b, typically a laser or laser array, provides illumination through a spherical lens 72b and a cylindrical lens 74b and directs light towards a turning mirror 82b. Light reflected from turning mirror 82b is modulated by diffraction at an electromechanical grating light modulator that serves as a linear light imaging modulator 85b, is diffracted past turning mirror 82b, and is sent as a line of light to color combiner 100.

Embodiments of the present invention provide improved image contrast by combining a code value adjustment with brightness attenuation of the modulated light. Brightness attenuation is achieved by interposing one or more electro-optical light modulators into the path of modulated light and selectively controlling the electro-optical modulator(s) to attenuate some percentage, but not all, of the light. Attenuation decreases the range of available light, but allows the same number of data values for light intensity to be used. In addition, adjustments to the display gamma curve are also made, to allow for non-linearities in display output and in viewer response. As a result of these combined adjustments, contrast within the more limited light range can be enhanced, increasing the visibility of details that were not previously perceptible when considering the full range of available light.

Figure 3A:
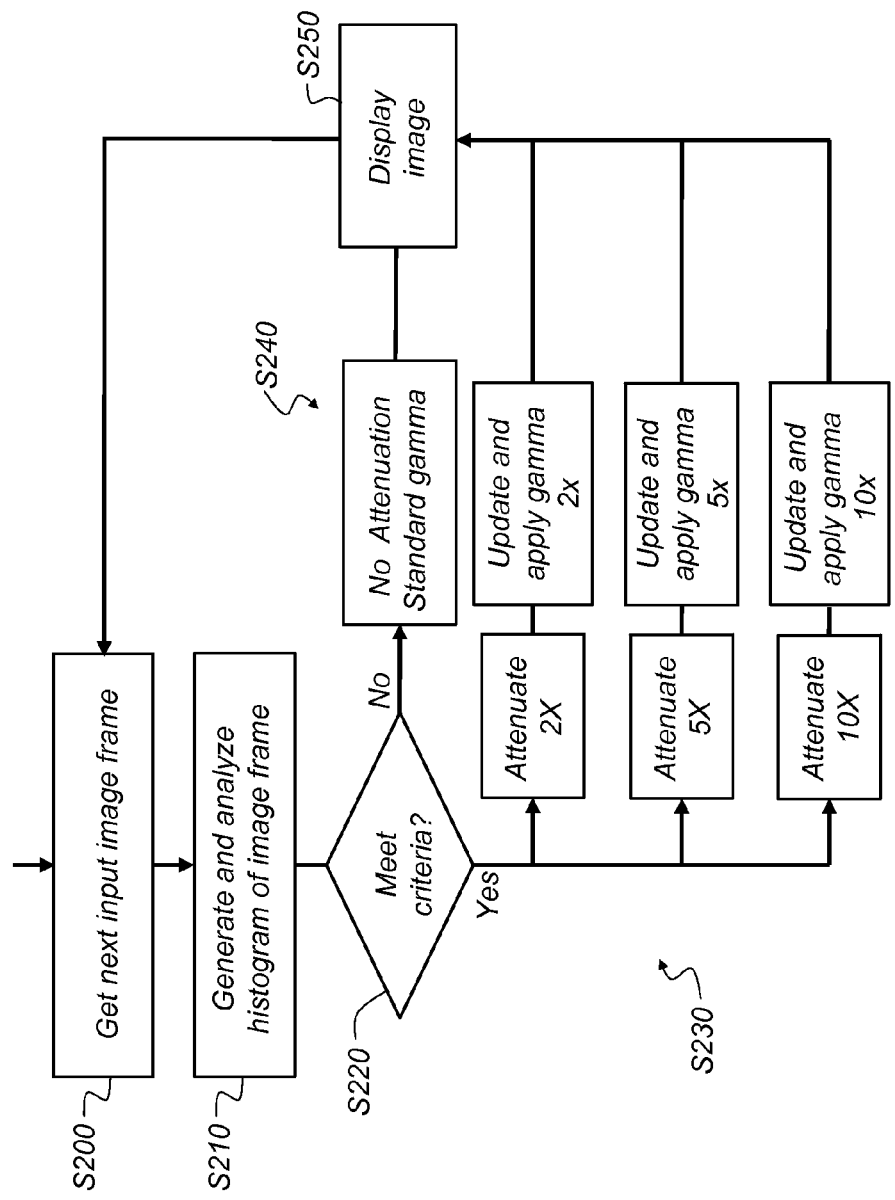
FIG. 3A is a logic flow diagram that shows steps for image attenuation and display according to one embodiment.

The logic flow diagram of FIG. 3A shows the sequence of steps used in order to obtain improved contrast for an image frame according to one embodiment of the present invention. An obtain image frame step S200 begins the process by obtaining the data for a single frame of the image. A histogram analysis step S210 then generates and analyzes a histogram of the image frame in order to determine whether or not the image meets the necessary criteria for contrast improvement using this method. Criteria for suitability are empirically determined but are chiefly based upon the distribution of dark image code values. In one embodiment, this is determined by whether or not dark code value bands or portions of significant size can be detected within the image. Histogram analysis provides one type of pixel value distribution data that can be a particularly useful tool for making this determination. Using histogram analysis, an accumulated count of pixels below a specific threshold value can also be used for determining whether or not the image frame has significant dark content and for quantifying that content in some way. In general histogram analysis needs to be performed on all three color planes in a color image, and the accumulated count of pixels below a specific threshold value criteria must apply to all three color planes in order to assess that the image frame has significant dark content. More sophisticated utilities, such as image processing algorithms that check for groupings of dark pixels within a region, can also be used to provide information about the distribution of dark pixel values.

A test step S220 then evaluates the image histogram analyzed in step S210 to determine whether or not the image meets the criteria for contrast adjustment along one of the processing paths shown collectively as processing step S230, or is displayed without attenuation and with the standard gamma curve applied. The gamma setting is applied in a gamma application step S240. If the criteria are met, a discrete level of brightness attenuation is identified, shown by way of example as either 2×, 5×, or 10× in FIG. 3A. As the scene content gets darker, it is desirable to use greater pixel intensity shifting at lower image pixel code values relative to that employed at higher image pixel code values. As an example a 2× brightness-attenuated image would be displayed with a gamma of 0.8 relative to the original image code values, a 5× attenuated image would be displayed with a gamma of 0.65 and a 10× attenuated image would be displayed with a gamma of 0.5. A display step S250 then displays the processed image. It can be noted that display step S250 can be executed immediately, so that the process shown in FIG. 3A executes as a part of the standard image processing chain for a projector or other apparatus, for example. Alternately, the computed attenuation and gamma information for an image frame can be stored for subsequent use and for display at a later time, using any of a number of display types.

Figure 3B:
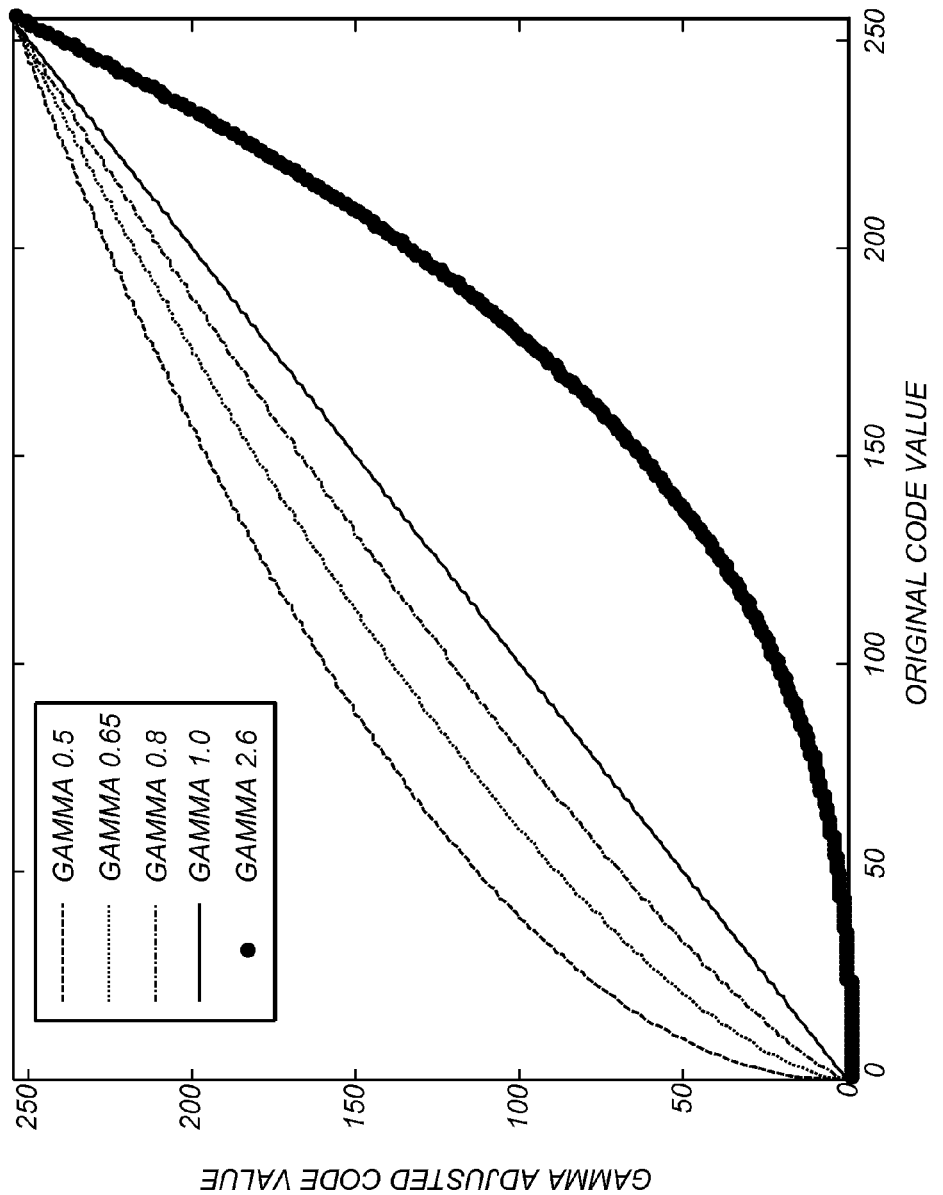
FIG. 3B, shows a set of gamma curves for representative gamma values.

Gamma correction is an operation that is well known in image display processing, used to encode and present image data in a form that is well suited to human perception and display characteristics. As applied in the apparatus and methods of the present invention, gamma is an adjustment applied to an input code value. Referring to FIG. 3B, there is shown a set of gamma curves for representative gamma values. For this example, 8-bit code values (0-255) are used. For reference, a gamma of 1.0 is linear, imparting no change to an input code value. The conventional display gamma for a typical DCI (Digital Cinema Initiatives) projector for digital cinema is 2.6, shown in bold in FIG. 3B. This gamma correction is applied by the projector or other display device to all input image data. In the method of the present invention, brightness attenuation is provided when the gamma value is less than 1, as shown in the logic flow diagram of FIG. 3A.

The output gamma code value (GCV) is given by the expression:

$$GCV = MCV*(OCV/MCV)^\gamma$$

where MCV is the maximum code value, OCV is the original code value and γ is the value of gamma. In a three color system, if the input image is provided in RGB coordinate space, this is calculated by creating a look up table of new gamma code values GCV vs. original code values OCV and applying the formula to each of the three color planes for each pixel in the image. The MCV is 255 ($2^8-1$) for 8 bit systems, and 4095 ($2^{12}-1$) for 12-bit systems.

Histogram analysis can be particularly efficient when a value range in the image histogram can be spatially correlated with a horizontal or vertical band or other specific area of the image. For the image shown earlier in FIG. 1, for example, the dark value range in the image histogram clearly maps to the buildings and other features along a lower band of the image.

Brightness Attenuation Components and Operation

Figure 4:
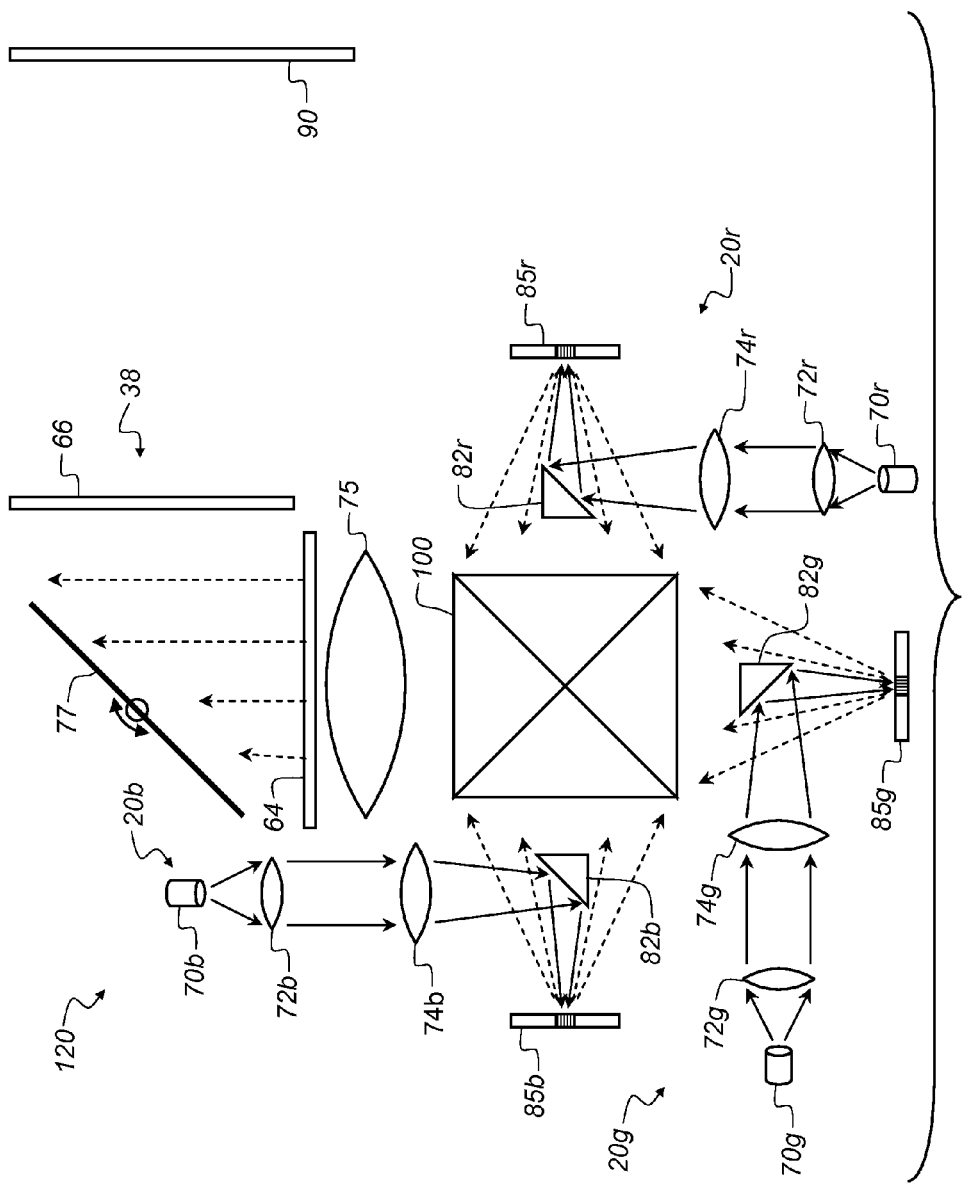
FIG. 4 is a schematic block diagram that shows components of a projection apparatus that uses a GEMS imaging modulator in each color channel and that is capable of providing improved image contrast according to one embodiment.

The schematic block diagram of FIG. 4 shows how brightness is attenuated by an attenuation apparatus 38 in one embodiment of a display apparatus 120 of the present invention. Attenuation apparatus 38 has two types of components: (i) a phase-modulating electro-optical modulator 64 that is a light polarization modulator disposed in the path of the combined modulated light, and (ii) an analyzer 66. When actuated by a variable control signal, electro-optical modulator (EOM) 64 changes the phase of the incident light, effectively rotating the polarization of the incident light by a corresponding number of degrees. Analyzer 66 has its transmission axis in parallel with light sources 70r, 70g, and 70b, so that modulated light passes through to display surface 90. Thus, analyzer 66 blocks a portion of the light that is modulated when EOM 64 is actuated.

In one embodiment, electro-optical modulator EOM 64 is an electrooptic polarization rotator, such as an LF Series Optical Shutter from BNS, Sweden. This device is conventionally driven with a 2-5 kHz square wave of up to ±20 V. When there is no drive signal applied, the liquid crystal molecules in this EOM device rotate the polarization of the input light by 90°. When an AC signal with a high amplitude is supplied to the polarization rotator, the liquid crystal molecules realign and no longer rotate the polarization of the incoming light. Alternately, the mode of operation of the phase-modulating electro-optic modulator 64 can be reversed, so that, when not actuated by a control signal, it changes the phase of the incident light by 90 degrees and, when actuated, it causes 0 degree change to the polarization.

In order for the EOM device to function properly, care is taken to provide a zero net DC bias to the liquid crystal layer. This is accomplished by applying a high frequency square wave during the closed state, typically between 2-5 kHz, as noted.

EOM devices of this type typically have different rise and fall response times. Rise time is defined as the amount of time for the rotator to switch from the energized state (0° rotation) to the de-energized state (90° rotation), measured from 10% to 90% of full modulation. Fall time is the amount of time for the rotator to switch from the de-energized state (90° rotation) to the energized state (0° rotation), measured from 90% to full 10% of full modulation. The rise time is generally fixed by the design of the polarization rotator and varies somewhat as a function of temperature. The fall time varies as a function of temperature as well, but it is also controlled by altering the amplitude of the AC drive signal. Higher amplitudes generally provide faster fall times.

Figure 5:
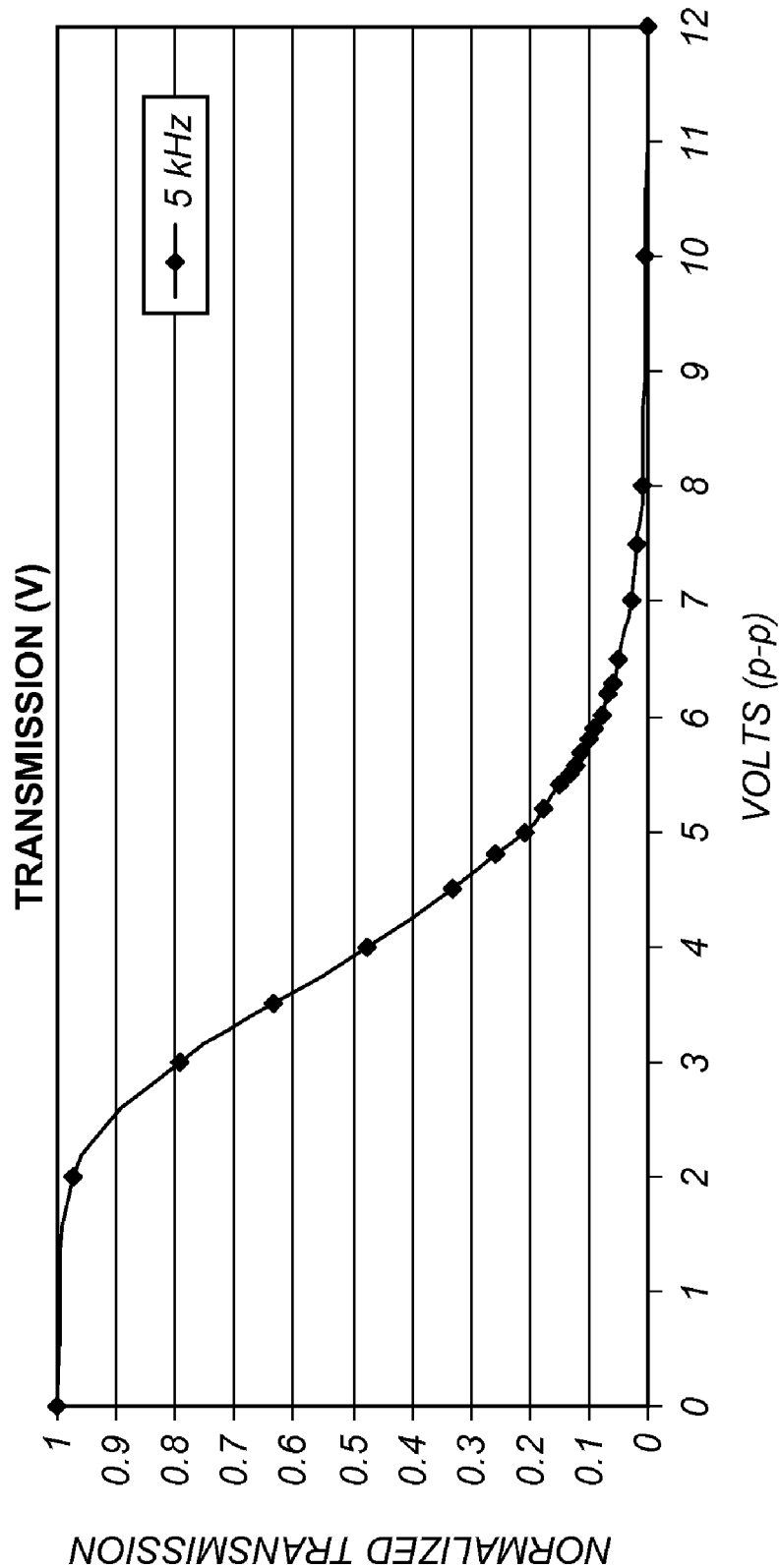
FIG. 5 is a graph showing relative transmission for a given voltage signal for a typical EOM device.

With EOM devices of this type, the relative amount of rotation of the incoming light is also controlled by the amplitude of the applied AC drive signal. A characteristic curve showing percent light output as a function of applied AC drive voltage is provided in FIG. 5. As this graph shows, the active region of the EOM device enables control of the level of light transmission throughput. For the device shown in FIG. 5, a drive voltage of 4 volts provides a 2× brightness attenuation, a drive voltage of 5 volts provides a 5× attenuation, a drive voltage of 5.9 volts provides a 10× attenuation and a drive voltage greater than 12 volts provides a near 100% attenuation with an on/off ratio greater than 500 to 1. Embodiments of the present invention allow use of this capability to provide a dynamically controllable level of modulated light, controlled according to image content.

Figure 6:
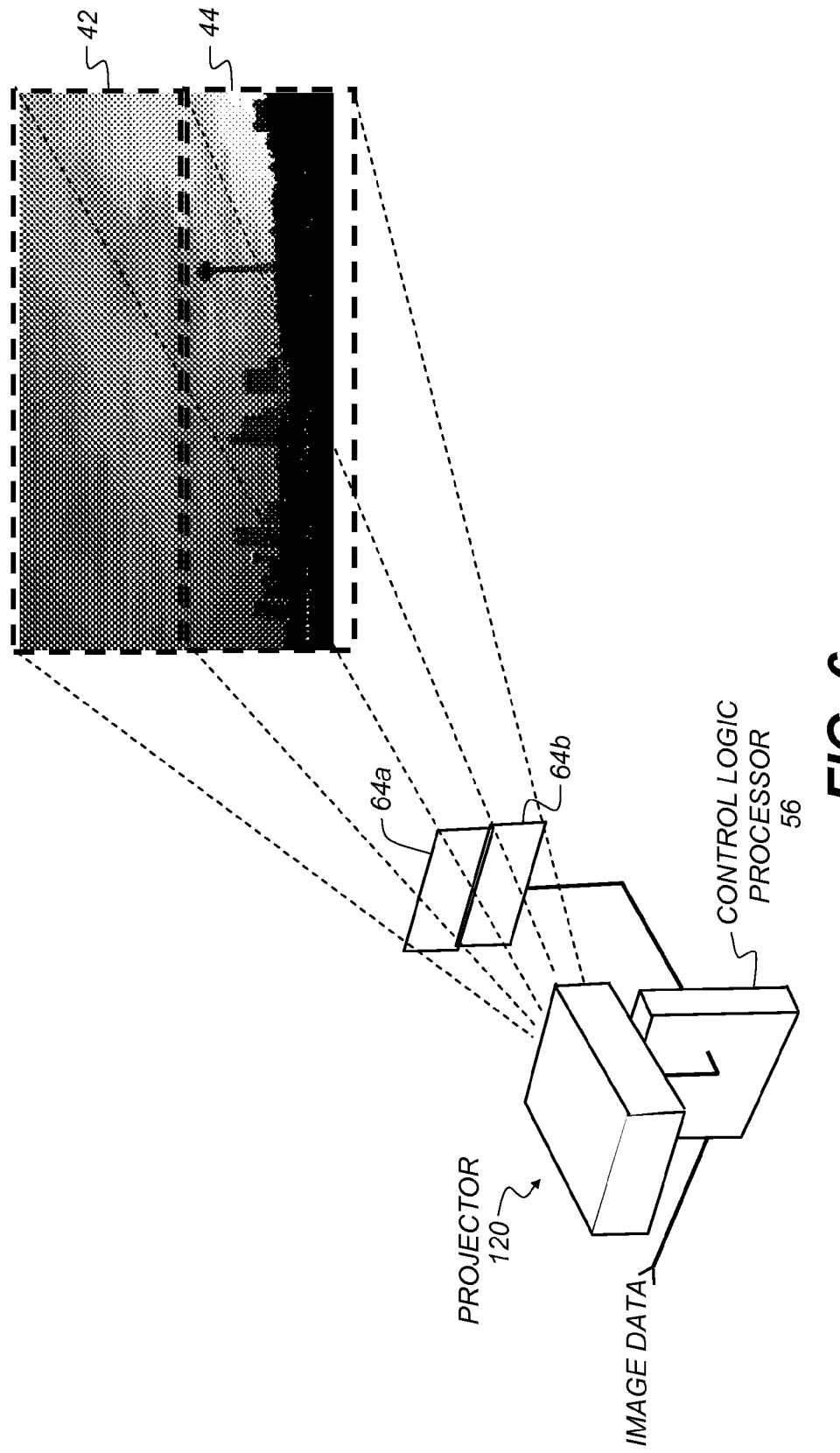
FIG. 6 is a perspective schematic view showing the use of control logic processor for analyzing image data and controlling projection and brightness attenuation apparatus accordingly.

FIG. 6 shows how display apparatus 120 of the present invention handles the evening cityscape image of FIG. 1 in one embodiment. Here, two EOMs 64a and 64b are shown being used for image display, each corresponding to a horizontal band or region 42 or 44 of the displayed image. Alternately; where control of various areas of the EOM itself is available, a single EOM could be used for the entire image frame, adaptive to the arrangement of image content. Depending on the type of EOM used, local control of brightness attenuation could even be applied to any portion or region of the image, even including brightness attenuation applied over one or more individual pixels or clusters of pixels. One consideration, however, in applying different attenuation levels to different portions of the image frame relates to transitions between portions, in order to minimize imaging anomalies. In yet another embodiment only one EOM 64 could be used for the entire image. A control logic processor 56 accepts and analyzes and conditions the input image data that goes to the light modulators in display apparatus 120 and performs the attenuation control and image data manipulation required for embodiments of the present invention. Control logic processor 56 controls the operation of EOMs 64a and 64b to provide the needed brightness attenuation, according to the analysis of the image frame.

Figure 7A:
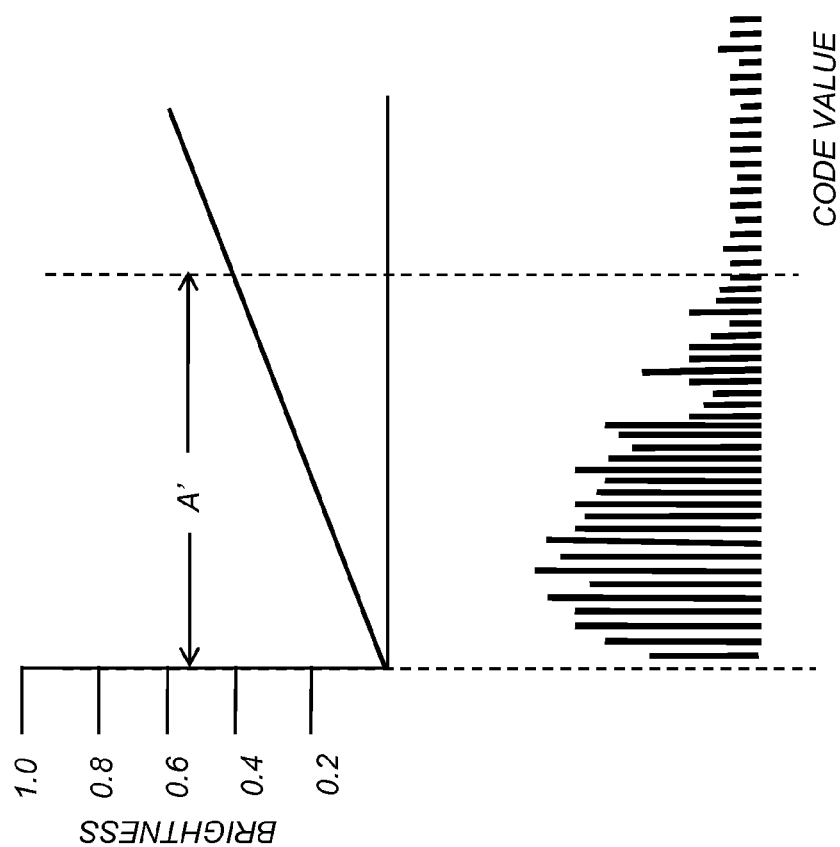
FIG. 7A shows an example histogram as conventionally used with a full brightness curve.

Referring back to the logic flow diagram of FIG. 3A, image analysis proceeds by obtaining a histogram or other type of representative distribution for data values in each defined horizontal or vertical region of the image or in the complete image frame (step S210). The schematic diagram of FIG. 7A shows a representative histogram for the skyline content of the image shown as region 44. As can be seen from this image, the bulk of values from the histogram are grouped within an interval A that corresponds to a small portion of the brightness values available. In the example of FIG. 7A, most of the histogram values for region 44 are within brightness levels not exceeding 0.4 normalized brightness. This means that a significant number of code values are unused or minimally populated, as shown. A significant portion of the darker pixels lie within the "dark noise" range, and thus provide relatively poor contrast over darker portions of the image. As a result of this distribution, very little contrast is achievable in the darker areas of the image.

Figure 7B:
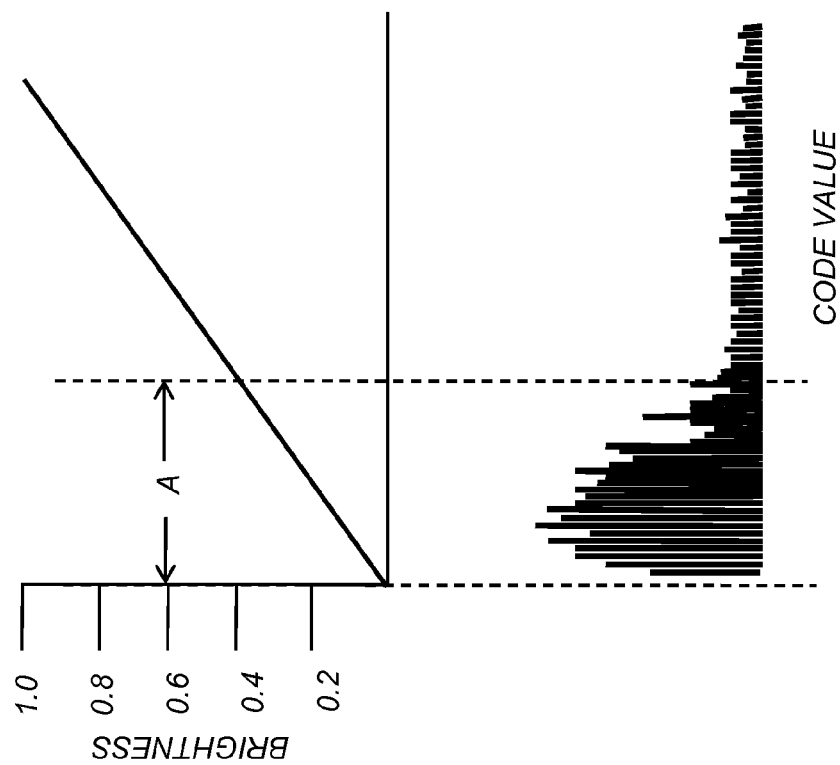
FIG. 7B shows an example histogram with an increased contrast range and reduced brightness.
Figure 8:
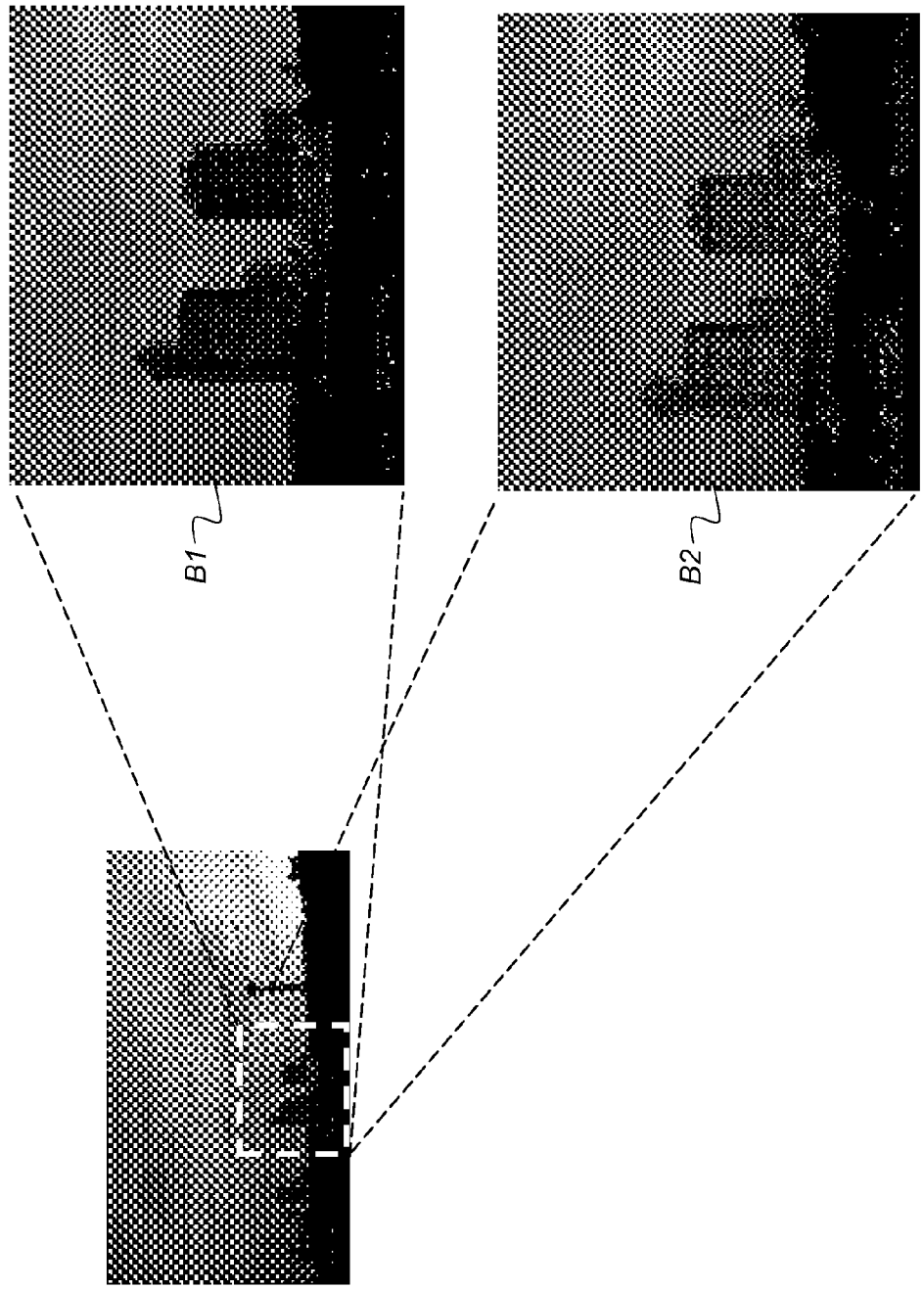
FIG. 8 shows imaging results for the image of FIG. 1 using the method of the present invention.

FIG. 7B shows schematically how the method of the present invention improves image contrast. First, the brightness level available is attenuated. In the example shown, only 0.6 of the brightness is now available due to modulation of EOM 64b (FIG. 6). However, this brightness attenuation allows previously little-used or unused code value space to be employed for contrast improvement. In effect, this expands interval A to provide interval A' as shown in FIG. 7B. Now, the range of brightness in the image is the same, but the number of brightness levels that are now available within this range is dramatically increased. The proportion of pixels that are now considered to be "dark noise" is greatly reduced. This leads to improved image contrast over the dark areas of this example, as shown in FIG. 8. For the image first shown in FIG. 1, two treatments of a portion of the cityscape are shown in FIG. 8. In a first image portion at B1, conventional treatment of the image for display is provided, with relatively poor contrast as a result. In the image portion at B2, the method of the present invention has been applied, with combined attenuation of the available brightness level and expansion of the range of available code values as described earlier with reference to FIG. 7B. This results in a dramatic improvement in image contrast. Again, it can be noted that the extreme light and dark tones of the example image are unchanged between image portions B1 and B2. However, the range of available tones is greatly expanded using the attenuation of overall brightness and range adjustment provided in embodiments of the present invention.

A number of observations can be made based on the example described with reference to FIGS. 6-8, including the following:

(i) A combination of both brightness attenuation and corresponding image data adjustment is provided by control logic processor 56 in order to achieve the resulting contrast improvement on an image-by-image basis. Darker regions can be in horizontal bands, vertical bands, or distributed with other geometries. For embodiments with more than a single EOM device in the image path, the flexibility of this method can be affected by how regions of the display surface are assigned relative to EOM devices.

(ii) Histogram manipulation expands the number of code values available for darker portions of the image, but this is at the cost of reducing the number of values available for brighter portions. The relative proportion of dark code values and the overall distribution of code values for an image frame can be factors in determining how to apply the method of the present invention.

(iii) Control logic processor 56 (FIG. 6) may be a computer workstation, microprocessor, or other type of computer device that performs image analysis and display control. Optionally, a separate microprocessor or other control logic device can be used specifically for EOM device control.

(iv) In practice, it may be cumbersome an unnecessary to provide a continuous range of brightness levels. Instead, a set of discrete brightness attenuation levels is typically used such as 2×, 5× and 10×, and would be set with corresponding gammas of 0.8, 0.65 and 0.5 respectively.

(v) Gamma adjustment to the code values is also provided as the overall brightness level is reduced by EOM control. Gamma adjustment curves are generally specific to a particular imaging system type.

FIGS. 9A through 9D show an example image to which the method of the present invention is applied. FIG. 9A shows the original outdoor image, taken near dusk. Features below the horizon are barely perceptible in the original figure. By way of simulation, FIG. 9B shows the results of a combination of attenuated brightness level and adjusted code values for the same image. Features below the horizon are now more clearly perceptible, as can be seen from the enlarged portion along the right side of each figure.

FIGS. 9C and 9D show the original and adjusted histograms, respectively, for FIGS. 9A and 9B. A brightness scale appears at the bottom of each histogram. As is clear from comparing the histograms, FIG. 9D expands the relative range of the code values allotted to the darker code values. A gamma value of 0.8 is applied in this example. A corresponding attenuation to image brightness, 50% in this example, allocates an expanded data range for these darker values.

Figure 9E:
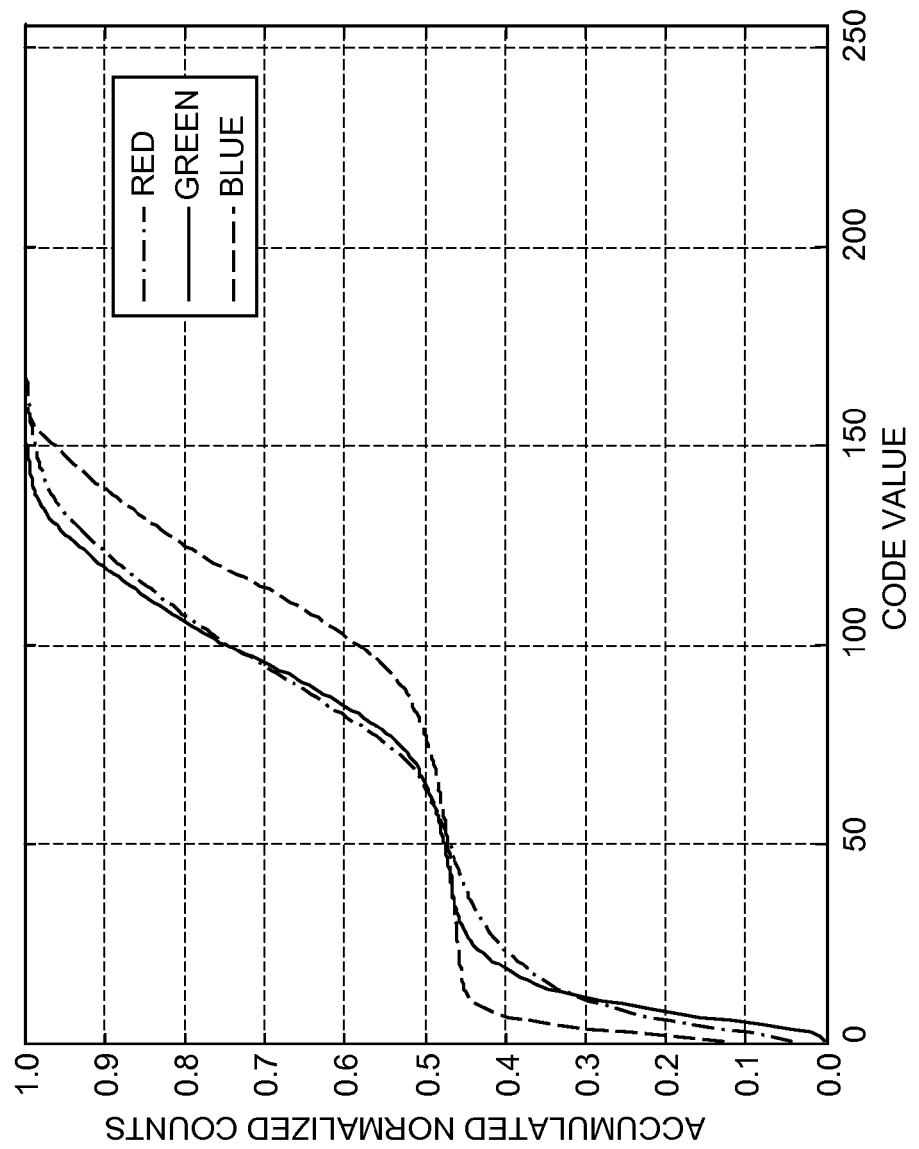
FIG. 9E is a graph that shows normalized accumulated counts versus code value obtained from each of the three color channels of the original image of FIG. 9A.

The graph of FIG. 9E shows, in normalized form, the accumulated counts versus code values obtained from each of the three color channels of the original image of FIG. 9A. As is clearly seen from this graph, the vast majority of pixel code values in all three color channels for the original image of FIG. 10A are below about 160; with less than 1% of the pixel code values above this level. Also, more than 50% of the pixel code values are below 80 in all three color channels.

Figure 10B:
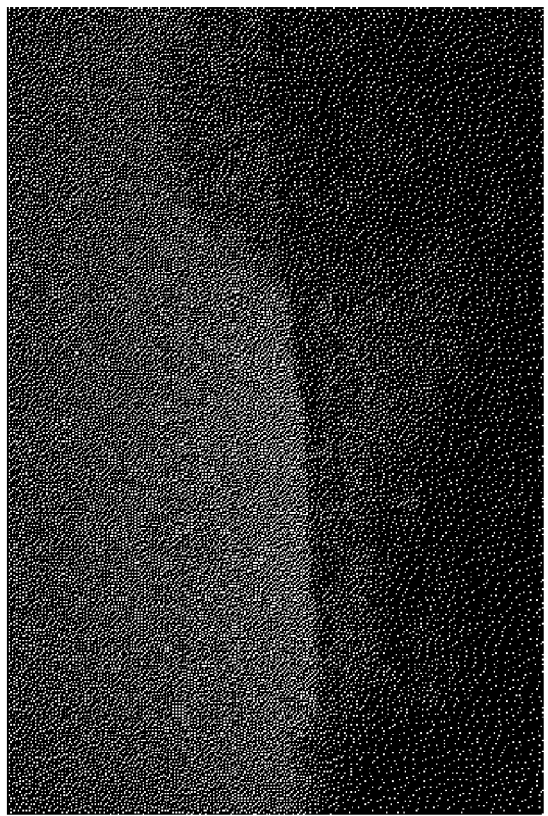
FIG. 10B is a simulated image showing the results of applying the method of the present invention to the original image of FIG. 10A.
Figure 10A:
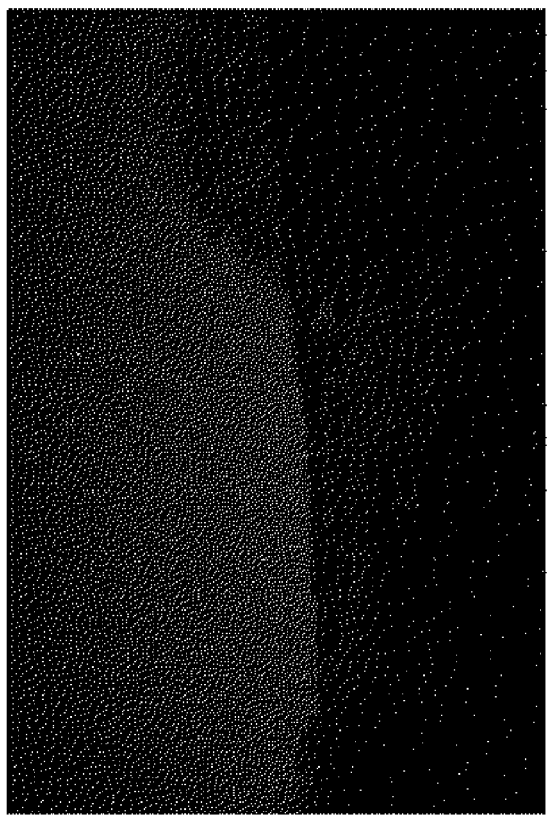
FIG. 10A is an example original image having considerable dark pixel content.

As a more pronounced example, FIGS. 10A through 10D show the method of the present invention applied to an image of the same scene as in FIG. 9A, but taken further toward nightfall. FIG. 10A shows the original image, in which the sky is barely discernable from the land and features of the landscape are not perceptible. FIG. 10B shows the resulting image after applying the combination of reduced brightness, here attenuated to 10% of the full range, plus adjustment of code values for the darker pixels, here with a gamma of 0.5. FIG. 10C shows a portion of the green channel, here, the bottom half, for the original image. FIG. 10D then shows the histogram for the same data with the 10% brightness attenuation and 0.5 gamma applied.

Figure 10E:
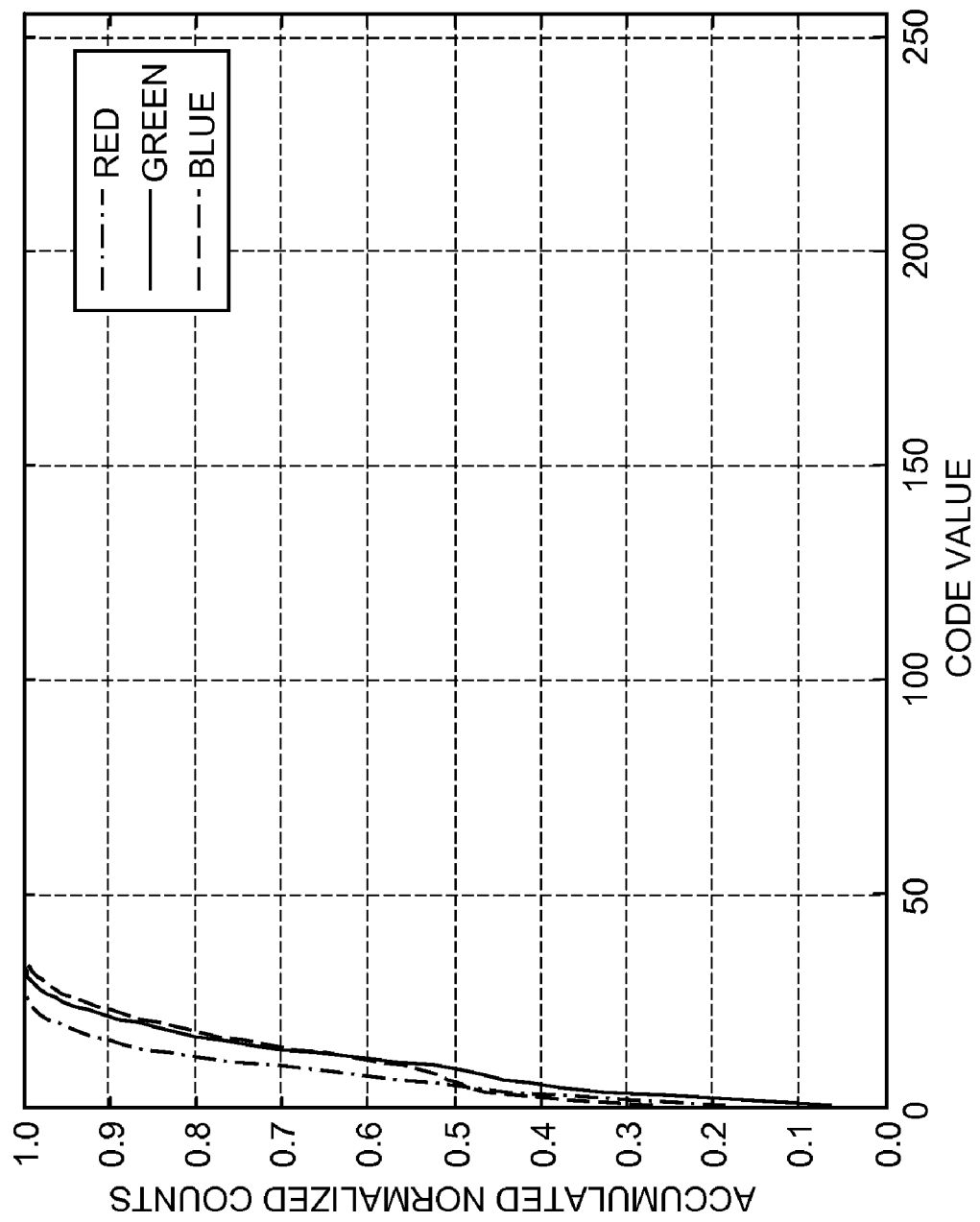
FIG. 10E is a graph that shows normalized accumulated counts versus code values obtained from each of the three color channels of the original image of FIG. 10A.

The graph of FIG. 10E shows, in normalized form, the accumulated counts for code values obtained from the original image of FIG. 10A. As is clearly seen from this graph, the vast majority of pixel code values for the original image of FIG. 10A are below about 36 in all three color channels; very few code values above this level are in this dark image. This is one type of information that can be used as a criterion for determining that there are substantial dark regions in an image and for ascertaining both the needed level of brightness attenuation and the code value adjustment to be used, such as applying a given gamma value.

Laser Blanking Between Frames

The method of the present invention can be used in conjunction with techniques that provide laser blanking between image frames. As was noted earlier with reference to the Kowarz et al. '481 patent, performance of GLV or GEMS ribbons and other electromechanical modulators can be degraded both by long-term actuation and by charge deposition in repeated actuation, which causes "stiction" and other negative performance effects. Therefore, in practice, the GEMS device is neither driven with too many pulses of the same polarity nor are the pixels driven continuously within an image frame. Because of this, various timing schemes continually reverse the actuation voltage polarity using a grounded substrate and a bipolar high voltage driver for each pixel or, alternately, repeatedly switch the substrate bias voltage itself. After each image frame is displayed, the substrate is driven to the opposite voltage polarity. The effect of either of these solutions on transient light is the same; there is some transient effect that can result in the unintended leakage of light during the frame refresh cycle.

Figure 11:
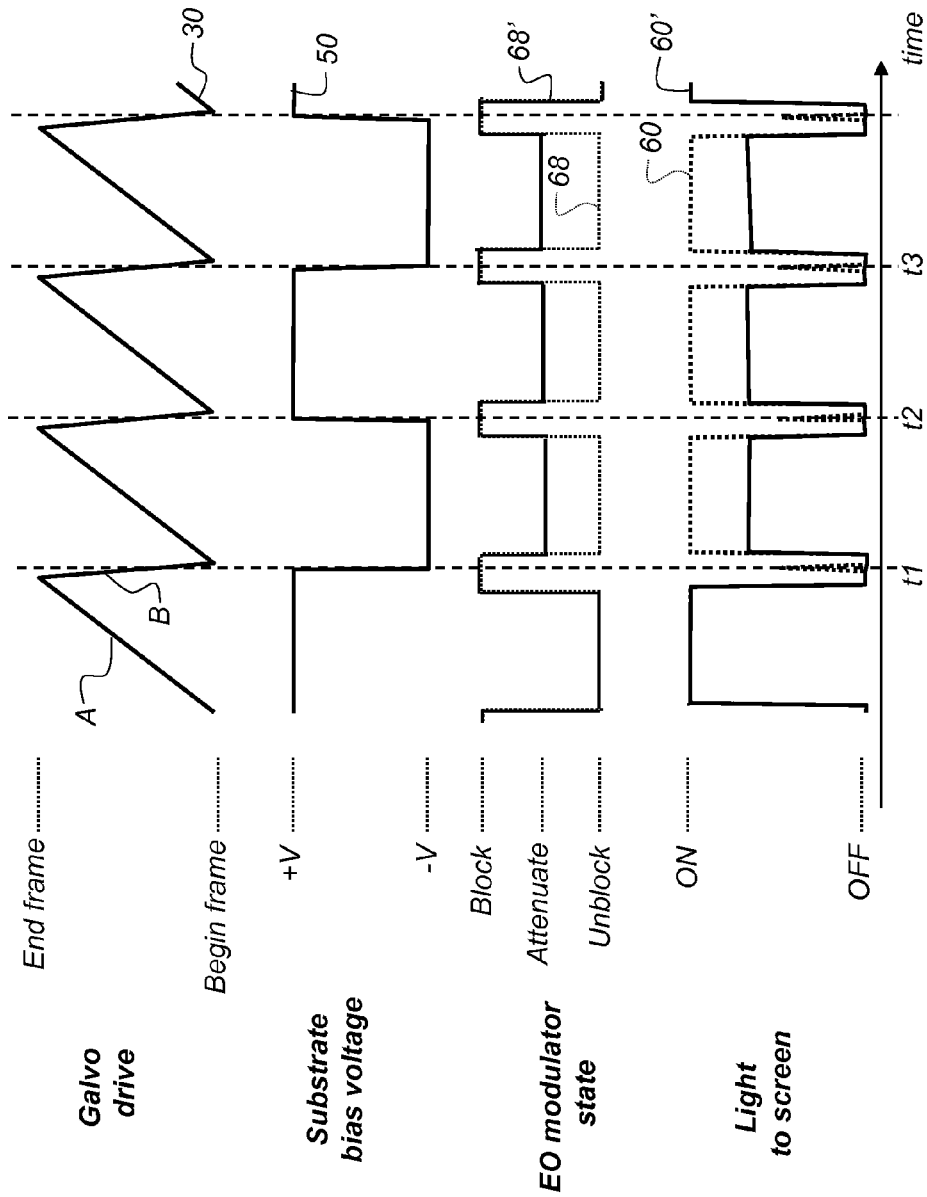
FIG. 11 is a timing diagram showing a number of signals used to provide laser blanking between image frames.

By way of example, the timing diagram FIG. 11 shows the temporal relationship of galvo drive signal 30 and a switched substrate bias voltage 50 and shows the effect of these switching signals as it relates to light delivery and light leakage for a GEMS or GLV projector. A light timing signal 60 (dotted curve in light to screen graph) shows the light ON or enabled, during writing portion A of the scanning cycle as the image is being scanned to the display. However, during retrace portion B of the scanning cycle, an output light transient is detected due to unintended ribbon element movement. As shown in FIG. 11, light transient repeats at each transition of substrate bias voltage 50, that is, once during each retrace portion B of the galvo mirror. The time interval between times t1, t2, and t3 as shown is approximately 16 msec in one embodiment.

The light to screen waveform 60' (solid curve in light to screen graph) is adapted to change the available brightness from frame to frame, as shown in the example of FIG. 11. The timing diagram of FIG. 11 shows the timing of an EOM signal 68' (solid curve in EO modulator state graph) relative to galvo drive signal 30 and bias voltage 50, and shows how EOM actuation impacts light timing signal 60'. The light transient between image frames is suppressed, eliminating this unwanted light from the output. Plus, the brightness attenuation and data manipulation of the present invention is performed, giving EOM devices 64a and 64b a dual purpose in display apparatus 120. The timing diagram of FIG. 11 also shows the EOM signal 68 (dotted curve in EO modulator state graph) which would be used when not attenuating during image frames, but includes blanking in between frames to suppress the light transient between image frames.

Figure 12:
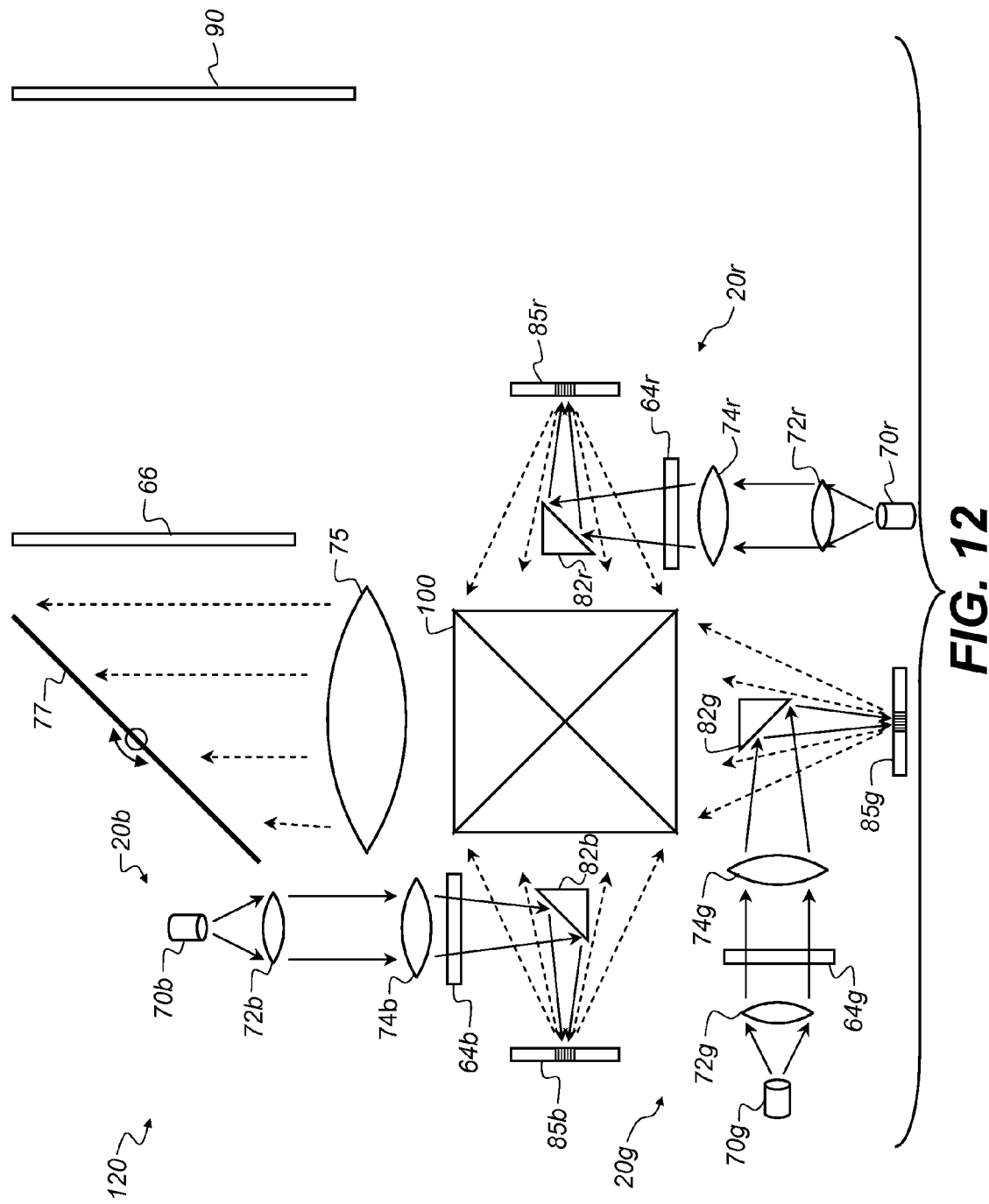
FIG. 12 is a schematic diagram that shows an alternate configuration for a display device according to one embodiment.

The alternate embodiment of FIG. 12 shows an embodiment of display apparatus 120 with an EOM 64r, 64g, 64b in each color channel and a single analyzer 66 at the output. Alternately, each channel may have an analyzer and an EOM. It may be sufficient for some applications to provide light modulation and laser blanking to only some of the color channels, such as only to the green color channel, which has the most pronounced effect on luminance.

In order to switch at sufficiently high rates for laser blanking, EOM 64a, 64b must have a fast response time. Until recently, EOM devices were not able to respond quickly enough for the display apparatus timing described with reference to FIG. 11. However, more recent improvements in EOM speed and overall performance are now making it possible to use these devices for the laser blanking required between image frames as well as for attenuation within the frames. EOMs that can be used for laser blanking as described with reference to FIGS. 4 and 10 can be any suitable types of devices, such as VX series modulators from Boulder Nonlinear Systems, Inc., Lafayette, Colo.

The apparatus and method of the present invention thus provide a dynamic illumination control for an image projection apparatus that can help to improve image contrast for individual image frames. When an image has a low maximum code value, the contrast of the image can be enhanced by making the blacks appear blacker and boosting the delivered code values of the image proportionally by the amount of attenuation. Also the modulation device can be segmented so that different regions on the screen can have different amounts of attenuation. This is useful for scenes in which bright areas exist such as sunny sky at the top and dark details at the bottom of the image. As an example, if the maximum intensity of a scene is only 10% of the maximum code values in the image can be adjusted by a 10x range and the attenuator can be set for 10x attenuation. This can significantly increase image contrast. Moreover, a variable optical shutter, such as an EOM, can provide both brightness attenuation during projection of an image frame and laser blanking between frames, wherein the laser blanking is synchronized to the frame generation sequence to minimize stray light on screen from light passing through the optics, such as when the lasers are off the screen for scanning GEMS- and GLV-based systems.

The apparatus and methods of the present invention have been described primarily with reference to projection systems that use GEMS, GLV, or other scanned linear light modulators. It must be noted, however, that the apparatus and methods of the present invention are also applicable to projection apparatus that employ area spatial light modulators, such as LCD modulators or micromirror arrays, such as those used in DLP devices. It should also be noted that the method of the present invention can be applied to all composite colors of a color projector or to one or more color channels.

The invention has been described in detail with particular reference to certain preferred embodiments thereof, but it will be understood that variations and modifications can be effected within the scope of the invention.

PARTS LIST 10 display apparatus
20r red color channel
20g green color channel
20b blue color channel
30 drive signal
38 attenuation apparatus
42 region
44 region
50 bias voltage
56 control logic processor
60 timing signal
60' timing signal
64 electro-optical modulator
64a electro-optical modulator
64r electro-optical modulator
64g electro-optical modulator
64b electro-optical modulator
66 analyzer
68 signal
68' signal
70r red light source
70g green light source
70b blue light source
72r spherical lens, red
72g spherical lens, green
72b spherical lens, blue
74r cylindrical lens, red
74g cylindrical lens, green
74b cylindrical lens, blue
75 lens
77 scanning element
82r turning mirror, red
82g turning mirror, green
82b turning mirror, blue
85r linear light modulator
85g linear light modulator
85b linear light modulator
90 display surface
100 color combiner
120 display apparatus
S200 obtain image frame step
S210 histogram analysis step
S220 test step
S230 processing step
S240 gamma application step
S250 display step
A interval
A' interval
B1 image portion
B2 image portion
t1 time
t2 time
t3 time

The invention claimed is:
1. A method for improving image contrast for a display apparatus comprising:

obtaining a frame of image data said image data comprising one or more code values for each pixel in the frame of image data;
analyzing the frame of image data to identify a distribution of dark regions therein;
adjusting at least one of the one or more code values for the frame of image data according to the distribution of dark regions in the frame of image data;
attenuating a brightness level available for the image frame according to the distribution of dark regions in the frame of image data; and
wherein the frame of image data includes a first portion and a second portion of image data from the frame and analyzing a distribution of dark regions within the first and second portions, adjusting at least one code value for each of the first and second portions, attenuating the brightness level of each of the first and second portions, and displaying the first and second portions of image data, wherein a brightness level attenuation for the second portion differs from the brightness level available for the first portion.

2. The method of claim 1 wherein analyzing the distribution of dark regions within the frame of image data comprises evaluating an image histogram.

3. The method of claim 1 wherein the frame of image data comprises the complete image.

4. The method of claim 1 wherein the frame of image data comprises a vertical or horizontal portion of the image.

5. The method of claim 1 wherein attenuating the brightness level comprises disposing an electro-optical modulator in the path of modulated light in the display apparatus.

6. The method of claim 1 wherein attenuating the brightness level comprises setting brightness to one of a set of fixed values.

7. The method of claim 1 further comprising attenuating output light after displaying the frame of image data.

8. The method of claim 1 further comprising displaying the frame of image data with the attenuated brightness level and adjusted code values.

9. The method of claim 1 wherein attenuating the brightness level applies the same attenuation to the entire image frame.

10. The method of claim 1 wherein attenuating the brightness level applies different attenuation over different portions of the image frame.

11. A method for improving image contrast for a display apparatus comprising:
obtaining a first frame of image data said image data comprising one or more code values for each pixel in the first frame of image data;
obtaining a second frame of image data said image data comprising one or more code values for each pixel in the second frame of image data;
analyzing the first and second frames of image data to identify a distribution of dark regions therein;
adjusting at least one of the one or more code values for the first frame of image data according to the distribution of dark regions in the first frame of image data and attenuating a brightness level available for the first image frame according to the distribution of dark regions in the first frame of image data;
adjusting at least one of the one or more code values for the second frame of image data according to the distribution of dark regions in the second frame of image data and attenuating a brightness level available for the second image frame according to the distribution of dark regions in the second frame of image data; and
attenuating the brightness level between display of the first and second image frames.

* * * * *